(12) United States Patent
Dwelly et al.

(10) Patent No.: US 7,379,017 B2
(45) Date of Patent: May 27, 2008

(54) MICRO MOVEMENT PULSED RADAR SYSTEM AND METHOD OF PHASE NOISE COMPENSATION

(75) Inventors: Wesley H. Dwelly, Sahuarita, AZ (US); Vinh N. Adams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 47 days.

(21) Appl. No.: 11/338,404

(22) Filed: Jan. 24, 2006

(65) Prior Publication Data

US 2007/0171119 A1    Jul. 26, 2007

(51) Int. Cl.
*G01S 7/292* (2006.01)
*G01S 13/50* (2006.01)
*G01S 13/00* (2006.01)

(52) U.S. Cl. .................... 342/159; 342/27; 342/28; 342/89; 342/94; 342/118; 342/134; 342/162; 342/175; 342/194; 342/195; 342/196

(58) Field of Classification Search .......... 342/89–103, 342/118, 134–145, 159–165, 173–175, 192–197, 342/202–204, 27, 28
See application file for complete search history.

(56) References Cited

U.S. PATENT DOCUMENTS

| | | | | |
|---|---|---|---|---|
| 3,787,854 A | * | 1/1974 | Friedman et al. | 342/28 |
| 4,714,873 A | * | 12/1987 | McPherson et al. | 342/174 |
| 4,891,649 A | * | 1/1990 | Labaar et al. | 342/203 |
| 5,448,501 A | * | 9/1995 | Hablov et al. | 342/28 |
| 5,519,400 A | * | 5/1996 | McEwan | 342/28 |
| 5,790,032 A | * | 8/1998 | Schmidt | 342/28 |
| 5,867,257 A | * | 2/1999 | Rice et al. | 342/192 |

(Continued)

OTHER PUBLICATIONS

J. Phillips et al., "Noise in Mixers, Oscillators, Samplers, and Logic: An Introduction to Cyclostationary Noise"; Version 1a; May 2000; posted on the Internet at www.designers-guide.org.*

*Primary Examiner*—Bernarr E. Gregory
(74) *Attorney, Agent, or Firm*—Noblitt & Gilmore, LLC (57) ABSTRACT

A pulsed radar system uses phase noise compensation to reduce phase noise due to drift of the reference oscillator to enable detection of micro movements and particularly human motion such as walking, breathing or heartbeat. The noise level due to A/D sampling must be sufficiently low for the phase noise compensation to be effective. As this is currently beyond state-of-the-art for high bandwidth A/D converters used in traditional receiver design, the receiver is suitably reconfigured to use analog range gates and narrow-band A/D sampling having sufficiently low noise level. As technology continues to improve, the phase compensation techniques may be directly applicable to the high bandwidth A/D samples in traditional receiver designs. Whether phase compensation is applied to traditional receiver designs or a receiver configured with analog range gates, the steps are essentially the same: data is processed to position a reference range bin (either an analog range gate or a particular time sample) on a stationary reference and the phase variation of that reference range bin is used to compensate the phase of target data in range bins (either an ensemble of range gates or other time samples) near the stationary reference. This effectively moves the radar system and particularly the reference oscillator to the stationary reference thereby greatly reducing oscillator drift and phase noise and decoupling the stand-off range from the level of phase noise.

33 Claims, 9 Drawing Sheets

U.S. PATENT DOCUMENTS 6,031,482 A * 2/2000 Lemaitre et al. .............. 342/28
6,208,286 B1 * 3/2001 Rostislavovich et al. ... 342/195
6,833,808 B2 * 12/2004 Rees et al. .................. 342/159

* cited by examiner

(PRIOR ART)

FIG.11

MICRO MOVEMENT PULSED RADAR SYSTEM AND METHOD OF PHASE NOISE COMPENSATION

BACKGROUND OF THE INVENTION

1. Field of the Invention

This invention relates to pulsed radar systems, and more specifically to a radar system and method of phase noise compensation capable of detecting micro movement.

2. Description of the Related Art

Doppler radar is used to measure both the range to target and the "doppler" movement of the target. Pulsed radar system emit pulses and A/D sample the return pulses to extract range and movement of the target. The pulses may be single-frequency pulses or more recently stepped frequency pulses. Typically, the pulses are in the RF band, approximately 4-100 nsec. Experimental "impulse" systems transmit very short pulses, less than 1 nsec to achieve instantaneous high range resolution. In each of these cases, the bandwidth of the A/D converter is quite high, 100 Mhz range for pulsed RF and 1 Ghz for impulse systems. Such high bandwidth A/D converters typically have a spur free dynamic range of no better than 60 dB and 30 dB, respectively.

Pulsed radar systems use an oscillator to generate the signals to form the transmission pulses. The frequency of the oscillator drifts over time. As a result, there is a phase shift between the frequency used to generate a transmission pulse and the frequency of the receiver that processes the return pulse solely due to this drift. This phase shift manifests itself as "phase noise". The level of phase noise is greatest near DC and increases as the range to target increases; the oscillator has a longer time to shift and thus will shift to a greater degree.

Pulsed radar systems do not compensate for phase noise other than to stabilize the oscillator to the degree possible. The reasons for this are threefold. First, the phase noise is typically overshadowed by the system noise associated with the A/D converter and receiver. Reducing the phase noise would have negligible effect on the overall noise level of the receiver. Second, until recently most radar applications were directed to targets at long stand-off ranges having a large radar cross-section and large Doppler frequency. For example, airplanes, missiles, and fast moving vehicles would produce a large return at a large Doppler shift from DC. These types of signatures typically lie well above the phase noise and above the system noise and can be detected using well known processing techniques. Finally, there is no known technique for effectively compensating for phase noise.

More recently efforts have been made to apply pulsed radar to urban environments or an urban battlefield. In these environments the stand-off range is much shorter, typically 100 m to 1 km, and the target signatures are much weaker. Instead of fast moving aircraft or missiles the targets are humans or slow moving vehicles, which present a much smaller radar cross-section and a much smaller Doppler shift (where phase noise is its greatest). Such attempts have been unsuccessful because the target signatures associated with "micro movement" are buried in the overall system noise and even the phase noise. The phase noise component can be alleviated somewhat at very short stand-off ranges. This may be adequate in non-hostile environments but is not acceptable under battlefield conditions.

There is a demonstrated and ongoing need for a pulsed radar system that reduces both A/D noise and phase noise sufficient to accurately detect micro movement in an urban environment or battlefield.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a pulsed radar system and method of detecting micro movements and particularly human motion such as walking, breathing or heartbeat. This is accomplished by using phase noise compensation to reduce noise due to drift of the reference oscillator. The radar system emits pulses and processes the return signals to position a reference range bin on a stationary reference such as a wall, tree, vehicle, etc. The system collects and processes additional data to compute the phase shift of the return signal in the reference range bin with respect to its initial phase and rotates the phase of the target data for range bins near the reference range bin by the phase shift. Because the reference is stationary any variation in the phase of the return signal for the reference range bin is solely due to phase noise in the system's reference oscillator. If the other range bins are sufficiently close to the stationary reference it is reasonable to assume that the phase noise component of any return signal off a target that lies within the range extent is nearly equal to the phase noise of the stationary reference. Accordingly, the phase compensation reduces the noise floor significantly, particularly for Doppler frequencies near DC. Consequently, the system can detect micro-movements such as human biometrics that would otherwise be buried in the noise due to their small Doppler shift and/or small amplitude. Furthermore, the system can detect such movements at increased stand-off ranges.

For phase compensation to be effective the system noise level must be low, which means the noise level of the receiver and A/D sampling should also be low. In current receiver designs the bandwidth of the A/D converters is on the order of the Tx/Rx pulses. At these high bandwidths for typical Radar systems, sufficiently low noise A/D converters are beyond the current state-of-the art. Should the technology evolve to a point where the noise levels are adequate, the phase compensation technique can be employed. Alternately, the receiver can be configured to use an ensemble of analog range gates and narrow bandwidth A/D converters with sufficiently low noise levels. The range gating function is provided by successive high bandwidth A/D time-samples in the former approach and by discrete analog range gates in the latter approach.

In one embodiment, the radar system emits pulses and receives the return signals using a plurality of analog range gates. The analog signals are band pass filtered, multiplexed and A/D sampled at a reduced bandwidth, hence lower noise. The radar system positions a reference range gate on a stationary reference such as a wall, tree, vehicle, etc. The system then places an ensemble of range gates in close proximity to the stationary reference and rotates the phase of the digitally sampled return signals from all other ensemble gates by the phase variation observed by the reference range gate. The combination of narrowband A/D sampling and phase compensation reduces the noise floor so that micro-movements are detectable.

In another embodiment, the radar system emits pulses and A/D samples the return signals at a high bandwidth. The radar system processes the collected data, selects a reference time sample having a large amplitude indicative of the stationary reference and calculates its initial phase. This is suitably done by representing each time sample as an I/Q sample pair. The system continues to collect and process data to compute the phase variation of the reference time sample with respect to its initial phase. The system rotates the phase of other time samples near the reference by this phase variation. Provided the noise level of the A/D sampling is good enough, e.g. SFDR>50 dB, the application of phase compensation to these existing Rx designs will lower the noise floor so that micro-movements are detectable.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a pulsed radar system and method of detecting micro movements and particularly human motion such as walking, breathing or heartbeat. This is accomplished by using phase noise compensation to reduce noise due to drift of the reference oscillator. The noise level due to A/D sampling must be sufficiently low for the phase noise compensation to be effective. As this is currently beyond state-of-the-art for high bandwidth A/D converters used in traditional receiver design, the receiver is suitably reconfigured to use analog range gates and narrow-band A/D sampling having sufficiently low noise level as described in FIGS. 2-9. As technology continues to improve A/D and receiver components, the phase compensation techniques may be directly applicable to the high bandwidth A/D samples in traditional receiver designs as described in FIGS. 10-11. Whether phase compensation is applied to traditional receiver designs or a receiver configured with analog range gates, the steps are essentially the same: data is processed to position a reference range bin (either an analog range gate or a particular time sample) on a stationary reference and the phase variation of that reference range bin is used to compensate the phase of target data in range bins (either an ensemble of range gates or other time samples) near the stationary reference.

Figure 1:
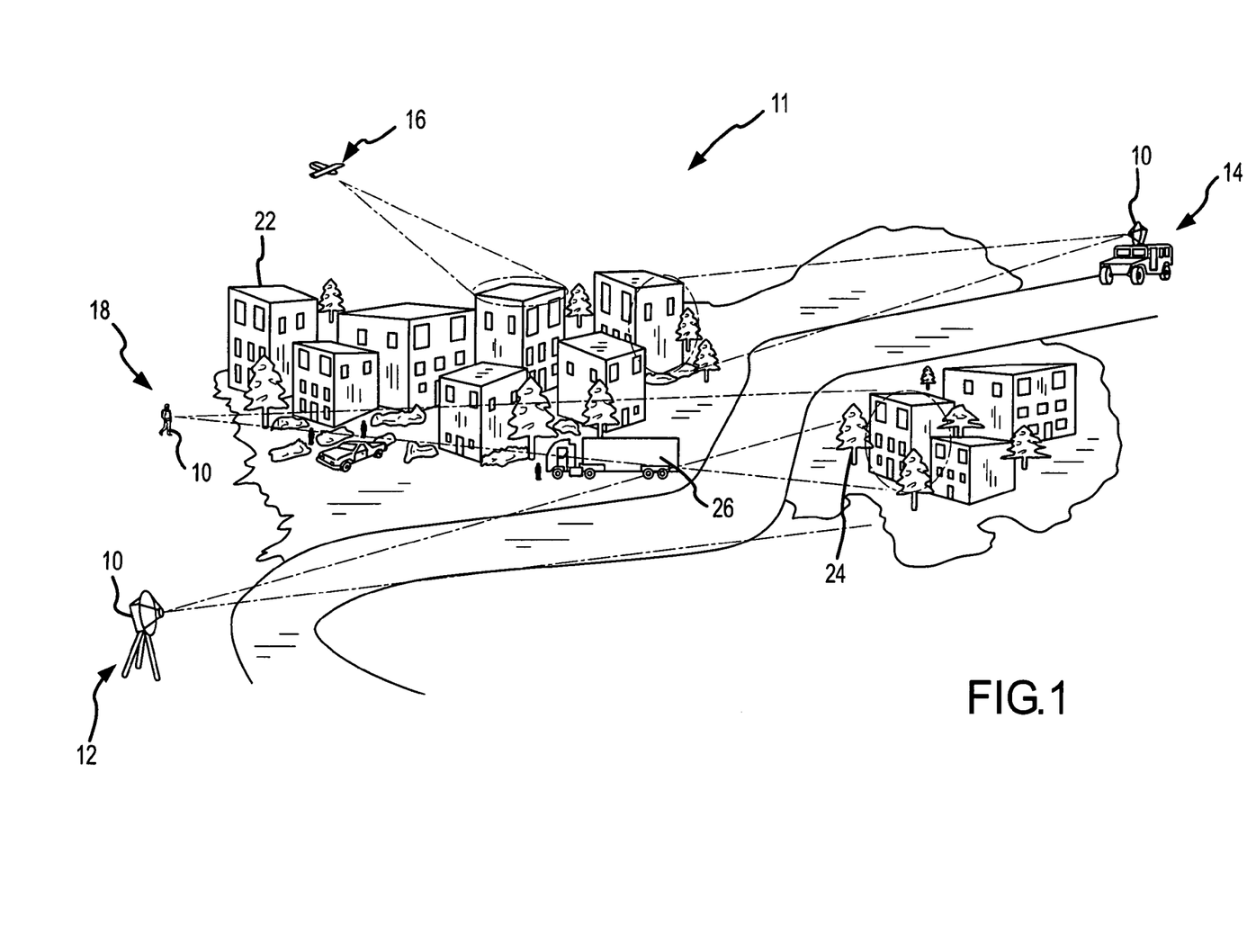
FIG. 1 is a diagram of a typical urban battlefield scenario in which radar systems are mounted on various platforms to detect the presence and movement of persons within and behind buildings.

As shown in FIG. 1, a radar system 10 can be deployed in an urban battlefield 11 on a tri-pod 12, humvee 14, unmanned aerial vehicle (UAV) 16 or soldier 18. Potential targets may include enemy combatants inside buildings 22, behind trees 24, next to vehicles 26 that might typically provide cover from visual or radar detection. Accurately detecting and identifying enemy combatants in such an environment is difficult and dangerous. Deployment of the radar systems within the urban battlefield near potential targets endangers the soldiers, equipment and the success of the mission. This radar system allows soldiers to detect enemy combatants through walls, roofs, trees, burms, etc. at stand-off ranges that provide a level of safety for the soldier and a higher probability of completing the mission successfully. The radar is capable of providing sufficient information content to enable classification of unarmed or armed occupants, whether they are moving or sitting and their position in relation to the wall, tree, burm, etc. Using well known radar techniques, a single system can provide range, a pair of systems can provide range and position and three systems can provide range, position and elevation.

Figure 2:
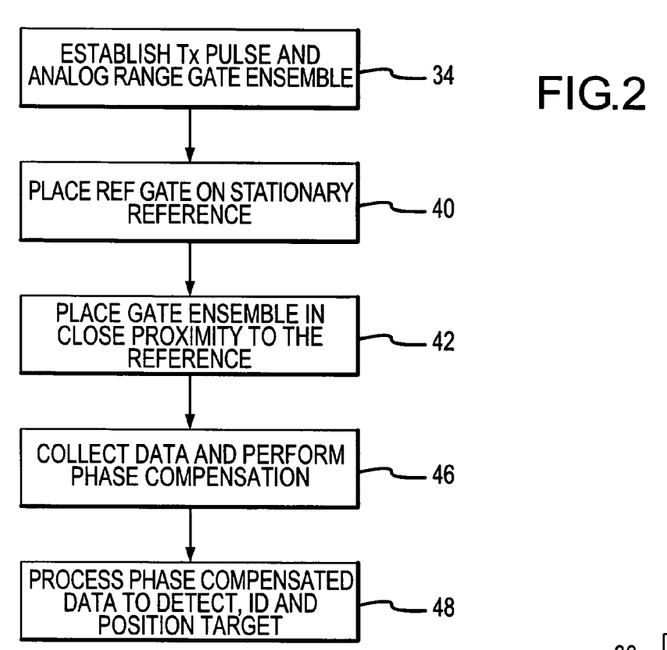
FIG. 2 is a flowchart of a phase compensated pulsed radar system for detecting micro-movement.
Figure 3A:
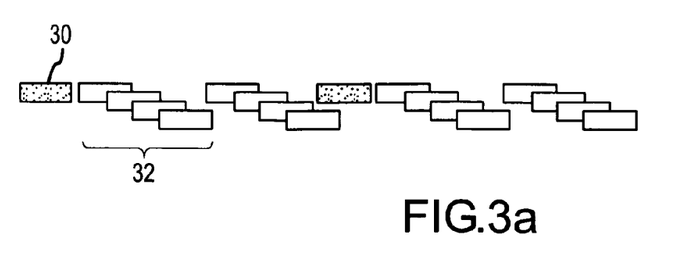
FIGS. 3a through 3c are diagrams illustrating the placement of a reference range gate on a stationary reference and an ensemble of range gates near that reference.
Figure 3B:
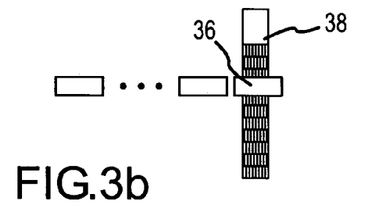
Figure 3C:
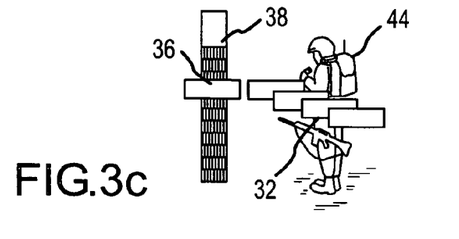

Since low noise high bandwidth A/D sampling is currently beyond the state-of-the-art, radar system 10 as shown in FIGS. 2 and 3 is configured to emit pulses and receive the return signals using a plurality of analog range gates. The analog signals are band pass filtered, multiplexed and A/D sampled at a reduced bandwidth, typically at least a factor of 100 less than the bandwidth of the RF pulse, and then processed. The radar system (or soldier operating the system) first establishes the transmit (Tx) pulse 30 and analog range gate ensemble 32 (step 34). Establishing the Tx pulse may include pulse shape, duration, and pulse repetition interval (PRI). Establishing the range gate ensemble may include the number of gates (at least one and preferably a plurality), duration of each gate and the overlap of gates. Overlapping allows the system to interpolate the return signals to determine target position with a resolution finer than the range gate size.

The radar system positions a reference range gate 36 on a stationary reference 38 such as a wall, tree, vehicle, etc. (step 40). A reference is considered to be stationary if its predominant return is DC. The positioning is suitably done by 'walking' one of the range gates in the ensemble to the wall until a large return is detected. More specifically, the system controls the interval between transmission of Tx pulses 30 and closing the range gate. As this interval increases the range gate gets further and further away until it reaches the wall. The same technique can be performed with a plurality or the entire ensemble of range gates as desired. Once a suitable stationary reference is detected, one of the analog range gates is declared to be the reference range gate 36 and is placed on the stationary reference so that the reference range gate will thereafter receive the return signal from the stationary reference. Because the reference is stationary any variation in the phase of the return signal is solely due to phase noise in the system's reference oscillator.

The radar system then places the ensemble of range gates 32 in close proximity to stationary reference 38 (step 42) to detect a target 44. If the ensemble of range gates are sufficiently close to the stationary reference it is reasonable to assume that the phase noise component of any return signal off a target that lies within the ensemble of range gates is nearly equal to the phase noise of the stationary reference. If the target, hence ensemble, is not sufficiently close to the stationary reference the assumption will not hold and the effectiveness of subsequent phase compensation will be diminished. For example, if the ensemble includes 16 analog range gates with a 50% overlap and each gate is 8 nsec wide (approximately 1.2 meters of range), the ensemble will cover approximately 9.6 meters to one side of the reference. This range can be extended by some combination of more gates, less overlap and wider pulses but in general 'close proximity' will be 100 meters or less. The range from the radar system to the stationary reference may be 50 m to a few kilometers with a typical range for urban battlefields being 100 m to 1 kilometer. At shorter ranges, the improvement over uncompensated systems is not as dramatic and at larger ranges the system becomes limited by other factors such as power and antenna capability. Note, the target can be behind, in front of or to the side of the reference as long as both the reference and the target are both illuminated by the radar beam. If the target is behind the reference, the reference must be non-solid metal otherwise the beam will not penetrate through to the target.

Once the reference gate is placed on the stationary reference and the ensemble of gates is in place, the system emits pulses and receives the return signals to collect data and perform phase compensation (step 46). The analog signals are band pass filtered, multiplexed and A/D sampled at the reduced bandwidth and then processed. The system rotates the phase of the digitally sampled return signals from all other gates by the phase variation received by the reference range gate. The result is that the noise floor is reduced significantly, particularly for Doppler frequencies near DC. Furthermore, the stand-off range is now decoupled from phase noise, and thus can be significantly longer, limited only by beam power and antenna capability. The system processes the phase compensated data to detect, identify and position micro-movements such as human biometrics that would otherwise be buried in the noise due to their small Doppler shift and/or small amplitude (step 48). Techniques for processing radar data to extract target information are well known to those of ordinary skill in the art.

Figure 4:
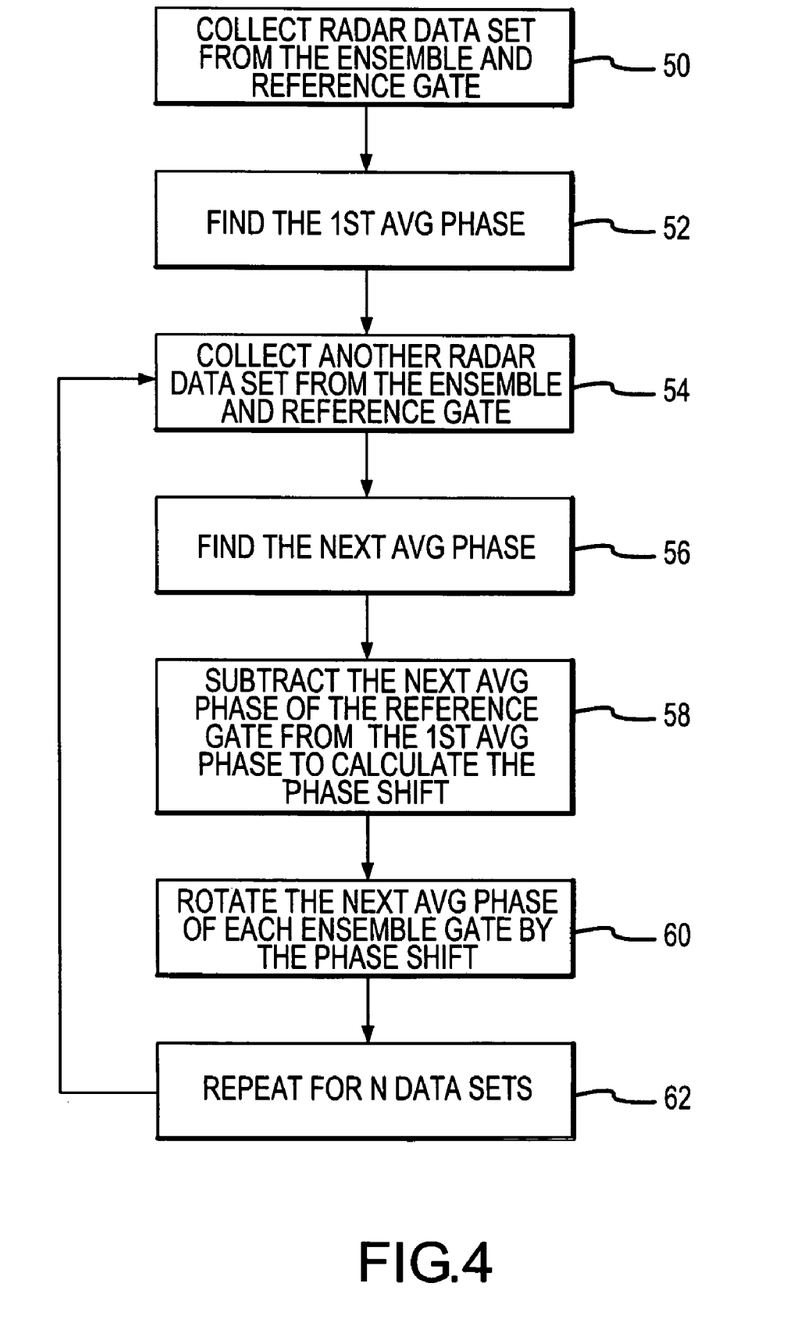
FIG. 4 is a flowchart of the steps for performing phase compensation for an IF Rx using analog range gating.
Figure 5:
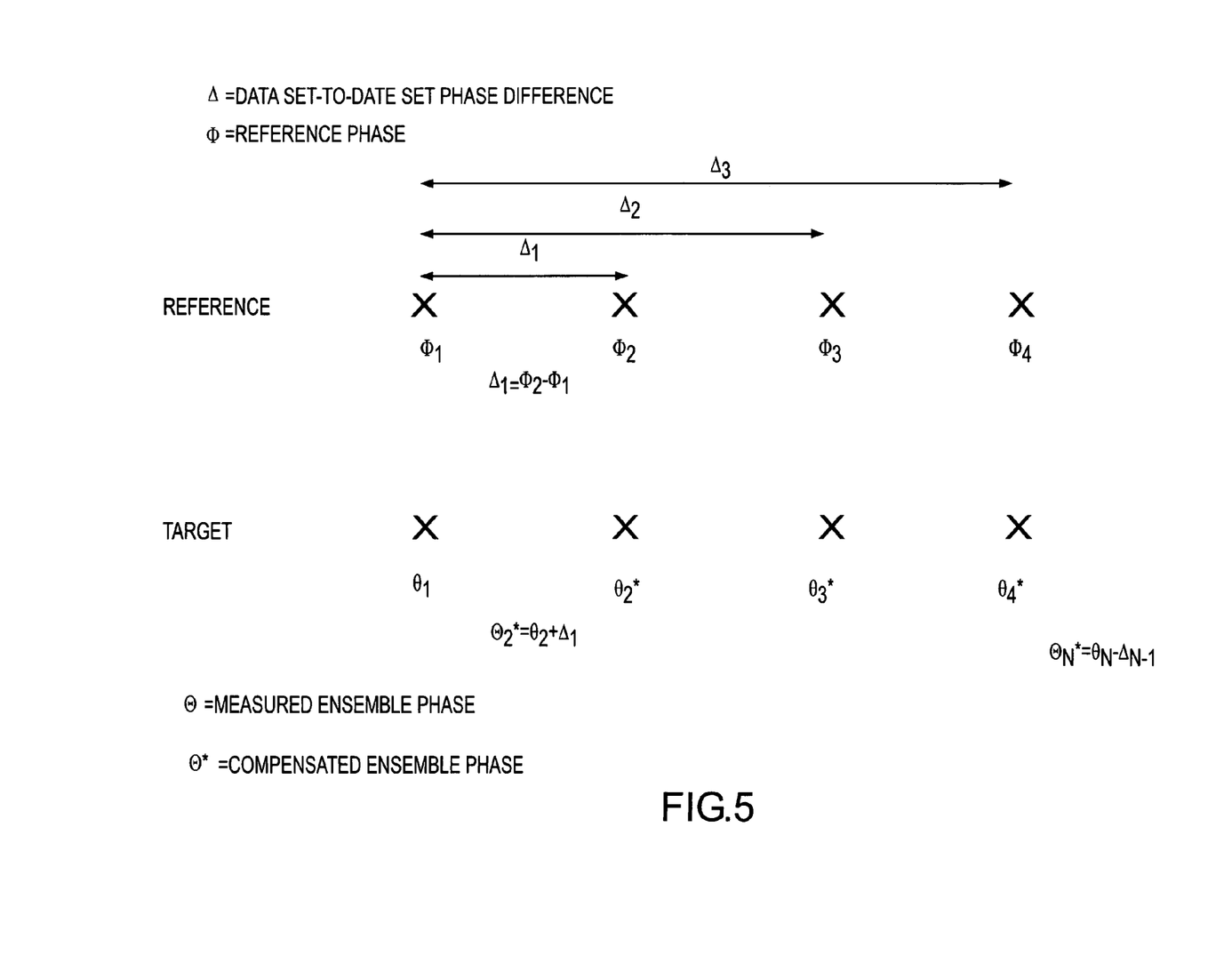
FIG. 5 is a diagram illustrating the sample-to-sample phase compensation.

An exemplary embodiment of the phase compensation algorithm for use with an ensemble of analog range gates and a simple illustration are shown in FIGS. 4 and 5. The radar system collects a data set ("X" in FIG. 5) from the reference and ensemble of range gates (step 50). The data set for each gate includes a plurality, e.g. 64 to 1028, of digital samples from the A/D. The A/D itself is downsampling from a pulse train, e.g. 1000 pulses that are individually captured by the range gate and band pass filtered. In a preferred embodiment, each sample is actually two samples, one for the in-phase or "I" component and one for the quadrature or "Q" component. The system then calculates a first average phase ($\Phi_1$, $\theta_1$, ... ) from the plurality of digital samples for each gate (step 52). This can be done by simply averaging the phase of the samples or by computing an FFT on the set of samples. The value in the DC bin of the FFT represents the average. Averaging the samples both reduces the amount of data to be processed and improves the SNR. The amount of data can be reduced because the spectral features of likely targets are typically contained in a relatively small spectral band, less than 200 Hz typically. The system collects another data set "X" from the reference and ensemble of range gates (step 54) and calculates a next average phase ($\Phi_2$ and $\theta_2$) for each gate (step 56).

The system subtracts the next average phase of the reference gate from the $1^{st}$ average phase of the reference gate to calculate a phase shift ($\Delta_1 = \Phi_2 - \Phi_1$) (step 58). The phase shift represents the drift of the reference oscillator in the time interval between measuring the first and second data sets over the range from the radar system to the stationary reference. The system rotates the phase of each range gate in the ensemble (except the reference) by the phase shift ($\theta_2^* = \theta_2 - \Delta_1$) (step 60). This has the effect of moving the radar system to the stationary reference thereby virtually eliminating phase noise due to drift of the reference oscillator provided the target is in close proximity to the reference. If the target is very close to the stationary reference so that the target is captured in the reference gate, the target signature will be reflected into all of the ensemble gates. The system can detect this and either report this fact or move the reference gate to a different stationary reference to reveal the target. The system repeats steps 54 through 60 until sufficient radar data is collected to detect the presence of a target (step 62).

Figure 6:
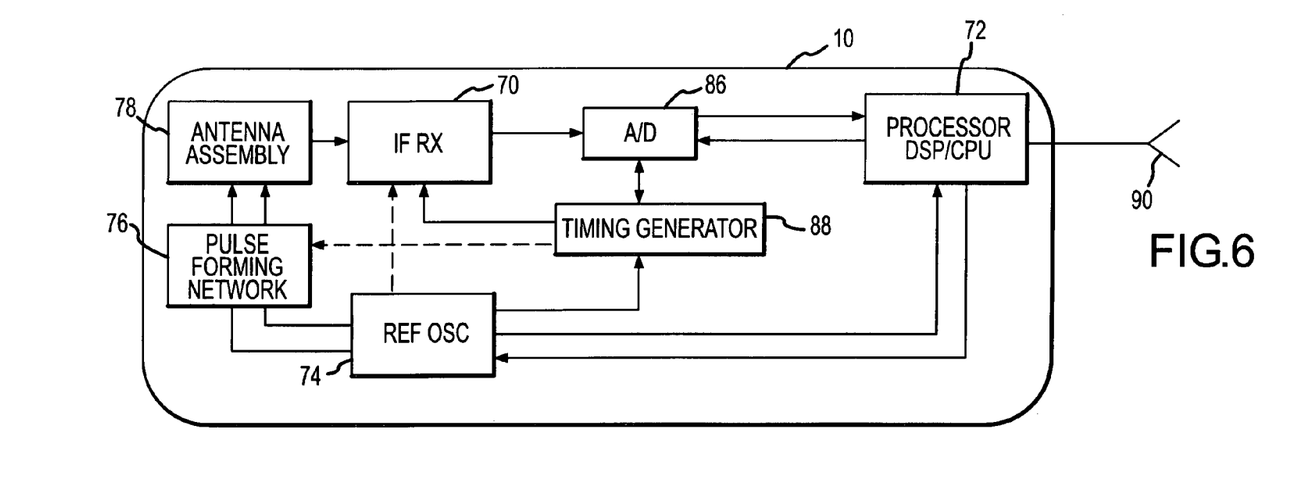
FIG. 6 is a hardware block diagram of the micro movement radar system.

At the block diagram level shown in FIG. 6, the hardware configuration for the radar system 10 is the same or very similar as that for a conventional single-frequency, stepped or impulse system. The differences are embodied first in the configuration of the receiver 70 to reduce system noise and second in steps executed by the processor 72 to perform phase compensation to reduce phase noise. As will be discussed below, if the technology for implementing the IF Rx improves its SFDR sufficiently phase compensation may be applied to conventional systems. Although the described techniques may be applied to stepped-frequency and impulse systems, for purposes of illustration an embodiment of a single-frequency RF system will be described.

Figure 7:
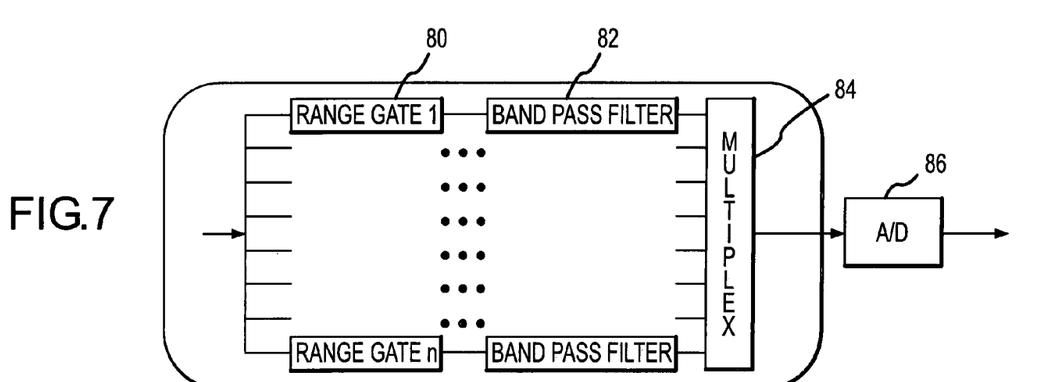
FIG. 7 is a block diagram of the IF receiver including a plurality of analog range gates.

In this exemplary embodiment, radar system 10 includes a reference oscillator 74 for generating RF signals and a pulse forming network 76 that forms RF pulses from those signals. RF pulses are typically 4-100 nsec in duration and roughly provide a resolution on the order of the size of expected targets. An antenna assembly 78 transmits the RF pulses and receives return pulses from a stationary reference and one or more targets. IF receiver 70 includes an ensemble of analog range gates 80 (e.g., an analog switch) for receiving return pulses that lie within a time window with respect to the transmit pulse, band pass filters 82 that suitably allow only the center spectral line of the pulse train and any additional Doppler coverage for the target to pass from each gate and be multiplexed by multiplexer 84 and fed to an A/D converter 86 that generates digital samples. The additional coverage is suitably tailored to the Doppler shift of the intended target and possibly knowledge of the reference oscillator drift. Extraction of only the center spectral line and a narrow bandwidth improves SNR. Instead of sampling each transmitted pulse as it is received as is done in conventional single-frequency, stepped and impulse systems, the transmitted pulse train is filtered for the center spectral line and then sampled. This approach has the benefit of operating the A/D at a much lower bandwidth, which reduces its noise to an acceptable level and allowing for shorter PRIs of the Tx pulse, which reduces phase noise from adjacent PRI lines. Processor 72 controls a timing generator 88 to (a) supply a clock signal to PFN 76 to transmit an RF signal and to IF Rx 70 to place an analog reference range gate on a stationary reference, (b) supply a clock signal to IF Rx 70 to place an ensemble of analog range gates in close proximity to the stationary reference, and (c) supply a clock signal to the PFN and IF Rx to transmit and receive pulses to collect data from the A/D sampled signal for the range gates and shift the phase of such ensemble data by the phase of the reference data. For a given Tx pulse, return signatures will be received for both the reference gate and any ensemble gates in which the target lies. The processor may process the phase-shifted ensemble data locally to determine the existence and position of a target within the ensemble or may transmit the phase-compensated data via a wired or wireless communication port 90 for processing elsewhere.

Figure 8:
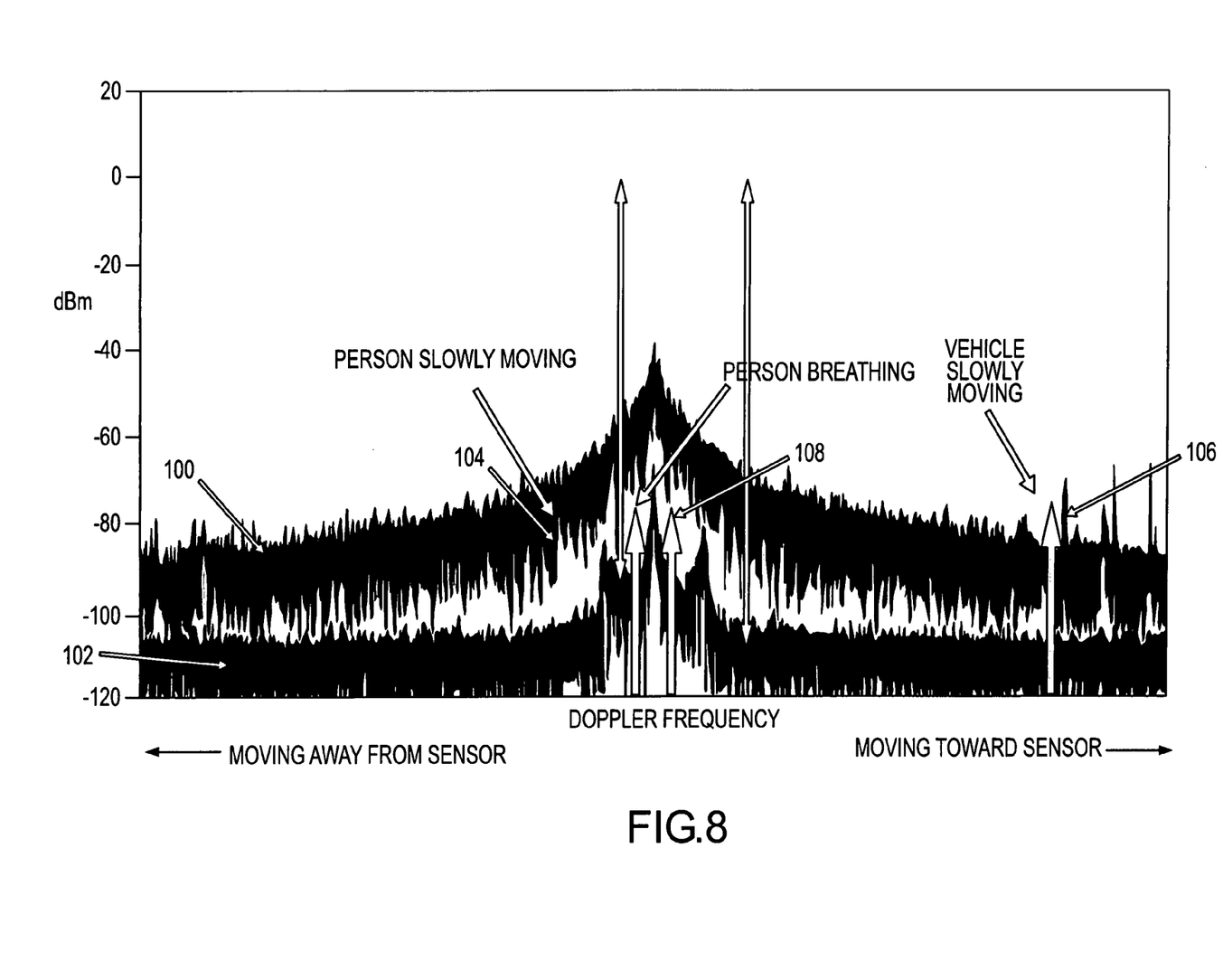
FIG. 8 is a plot of phase noise for an IF receiver in a pulsed radar system with and without phase compensation.

The effectiveness of the radar system and method of phase compensation in an urban battlefield environment is illustrated in FIGS. 8 and 9a-9c. A plot of phase noise 100 before and phase noise 102 after phase correction are shown in FIG. 8. Phase noise plots the return amplitude from a fixed target versus Doppler frequency. If the reference oscillator was perfect, no drift, the phase noise would consist of one large peak at DC. However, because the oscillator does drift with time there is a certain amount of phase noise induced between the transmission and receipt of a pulse. The phase noise still peaks at DC and rolls off toward larger Doppler frequencies as the probability of a large drift is less than that of a smaller drift. Furthermore, the 'noise floor' moves up and down with range to target. The larger the range, the greater the probability of drift and thus the higher the noise floor. The phase noise 102 of the phase compensated system is not perfect due to the non-zero distance between the reference and the target but is vastly lower than the uncompensated system.

Figure 9A:
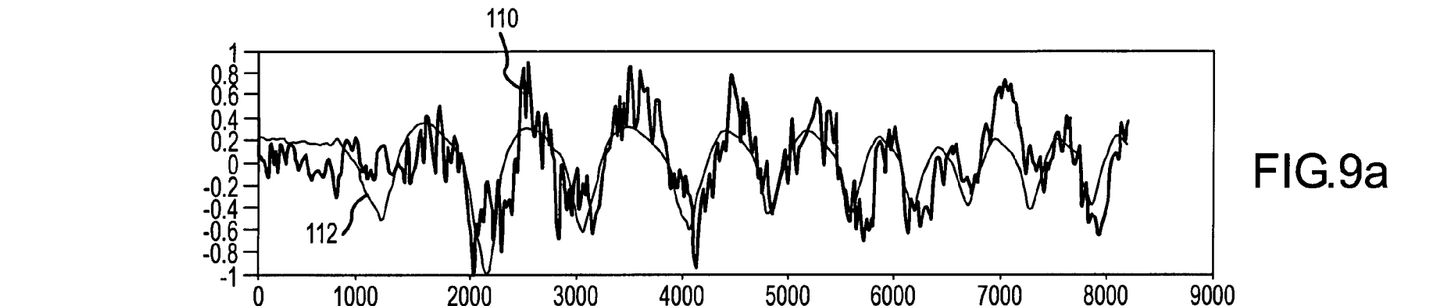
FIGS. 9a through 9c are diagrams comparing measured biometric data against signals extracted from the phase compensated radar data.
Figure 9B:
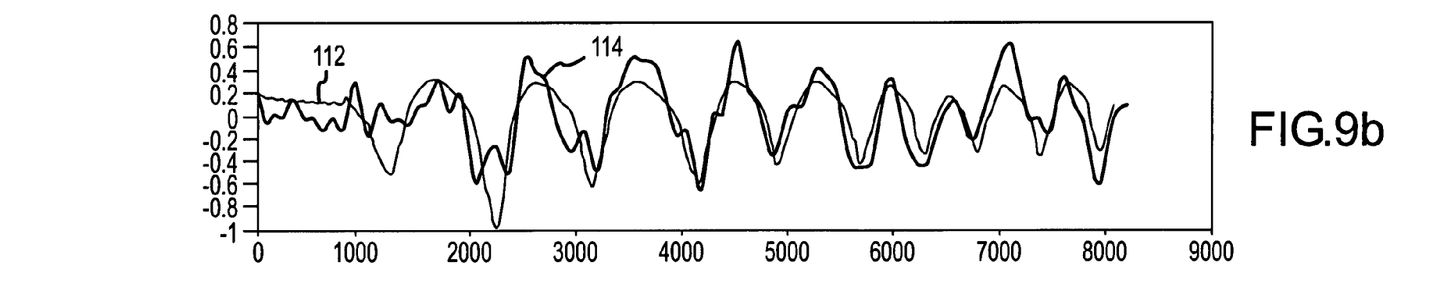
Figure 9C:
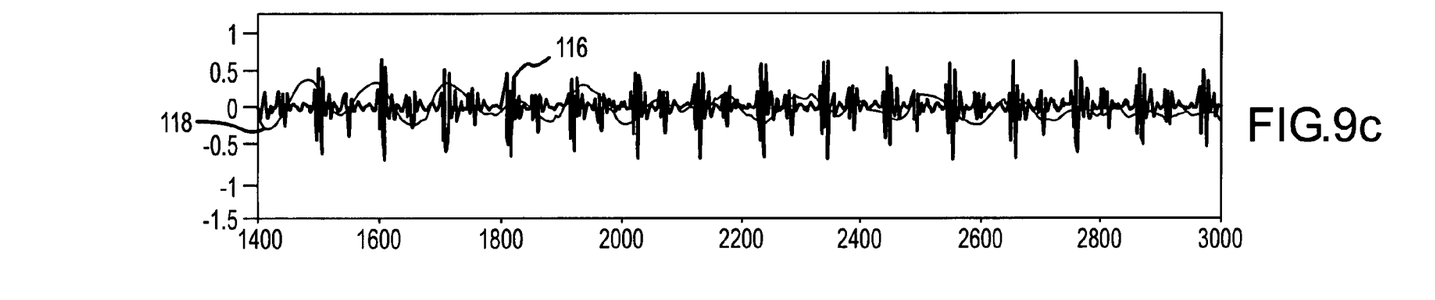

As shown phase compensation has a dramatic effect on phase noise, improving the SFDR inside 12 Hz from approximately 60 dB to about 90 dB and SFDR outside 12 Hz from approximately 75 dB to about 110 dB. Return signatures for a slowly moving person 104, a slowly moving vehicle 106 and a person breathing 108, which would otherwise be buried in the noise now lie well above the noise floor and will be detectable using standard processing techniques. As shown in FIG. 9a, phase compensated radar data 110 closely tracks chest movement 112 measured by a chest pressure transducer. As shown in FIG. 9b, a low pass filtered version 114 of the phase compensated radar data 110 more closely tracks the measured chest movement. As shown in FIG. 9c, phase compensated radar data 110 has been band pass filtered to bring out the heartbeat frequency 116 which close tracks a measured human heartbeat 118. The demonstrated capability to reduce both IF Rx and phase noise to levels at which micro-movements can be detected will be invaluable to the deployment of radar systems in urban battlefields.

To achieve this high dynamic range certain trade offs must be made. The range coverage of the radar is limited to the number of analog range gates, their range gate width and spacing. For example, 8 analog range gates, each 8 nsec wide spaced end to end provides 9.6 meters of coverage (8 nsec is 1.2 meters of range coverage in free space) from the stationary reference, which itself is suitably 100 m-1 km from the radar system. The range can be extended by using more or wider gates or by walking the ensemble to detect a target. However, the effectiveness of phase compensation is reduced as the ensemble gets further away from the reference. The signal loss by filtering the center line of a spectrum is 20 * log (duty cycle) as opposed to 10 * log (duty cycle) for sampling the entire spectrum. However, band pass filtering also reduces the amount of noise, thereby increasing the SNR.

Notwithstanding these trade-offs, the benefits in an urban environment are considerable. For applications like See Through the Wall (STTW), Perimeter monitoring or mine detection a range coverage of less than 30 ft is acceptable. The 20 * log (duty cycle) signal loss is more than compensated for by the lower bandwidth (lower noise floor). The advantage is over 90 dB of Spur Free Dynamic Range inside of 12 Hz and over 100 dB outside of 12 Hz. This allows the Radar to see very small changes in the presence of large stationary clutter, e.g. walls.

Figure 10:
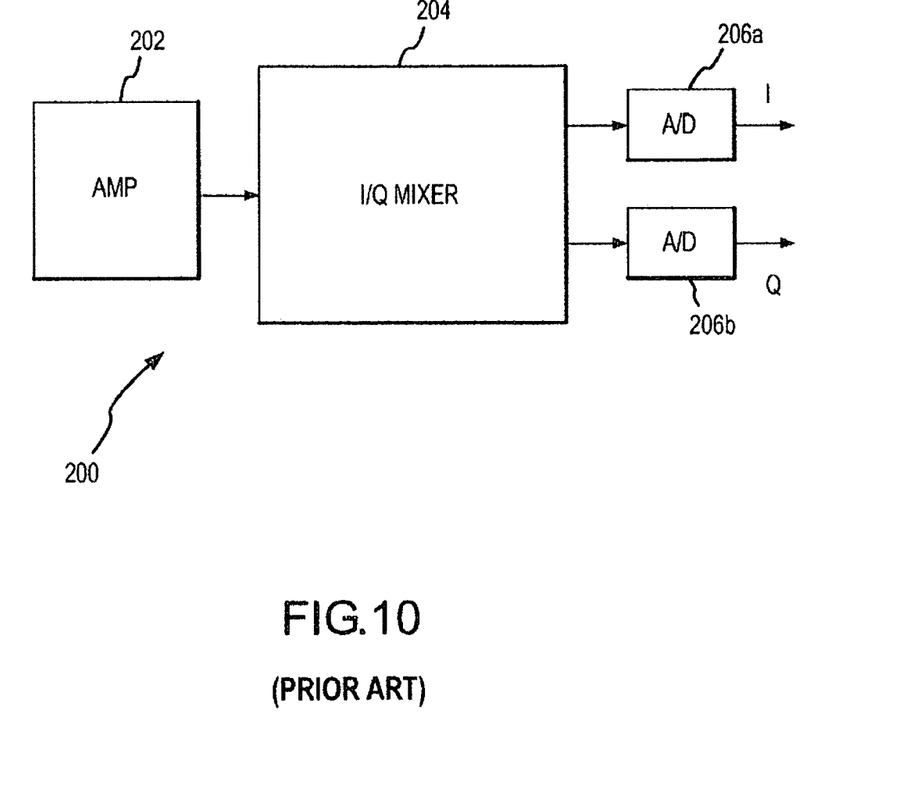
FIG. 10 is a block diagram of a known IF receiver.

As mentioned previously, if the technology for implementing conventional receivers improves the SFDR of the A/D converter sufficiently, e.g. >50 SFRD, phase compensation may be applied to conventional systems without analog range gating. As shown in FIG. 10 an example of a known Radar IF Rx 200 includes an amplifier 202 and I/Q mixer 204 that amplify and mix the return signals to generate in-phase and quadrature signals that are A/D sampled by high bandwidth A/D converters 206a, 206b to produce I/Q samples pairs. The A/D converters will typically have a bandwidth on the order of the bandwidth of the Tx and Rx pulses.

Figure 11:
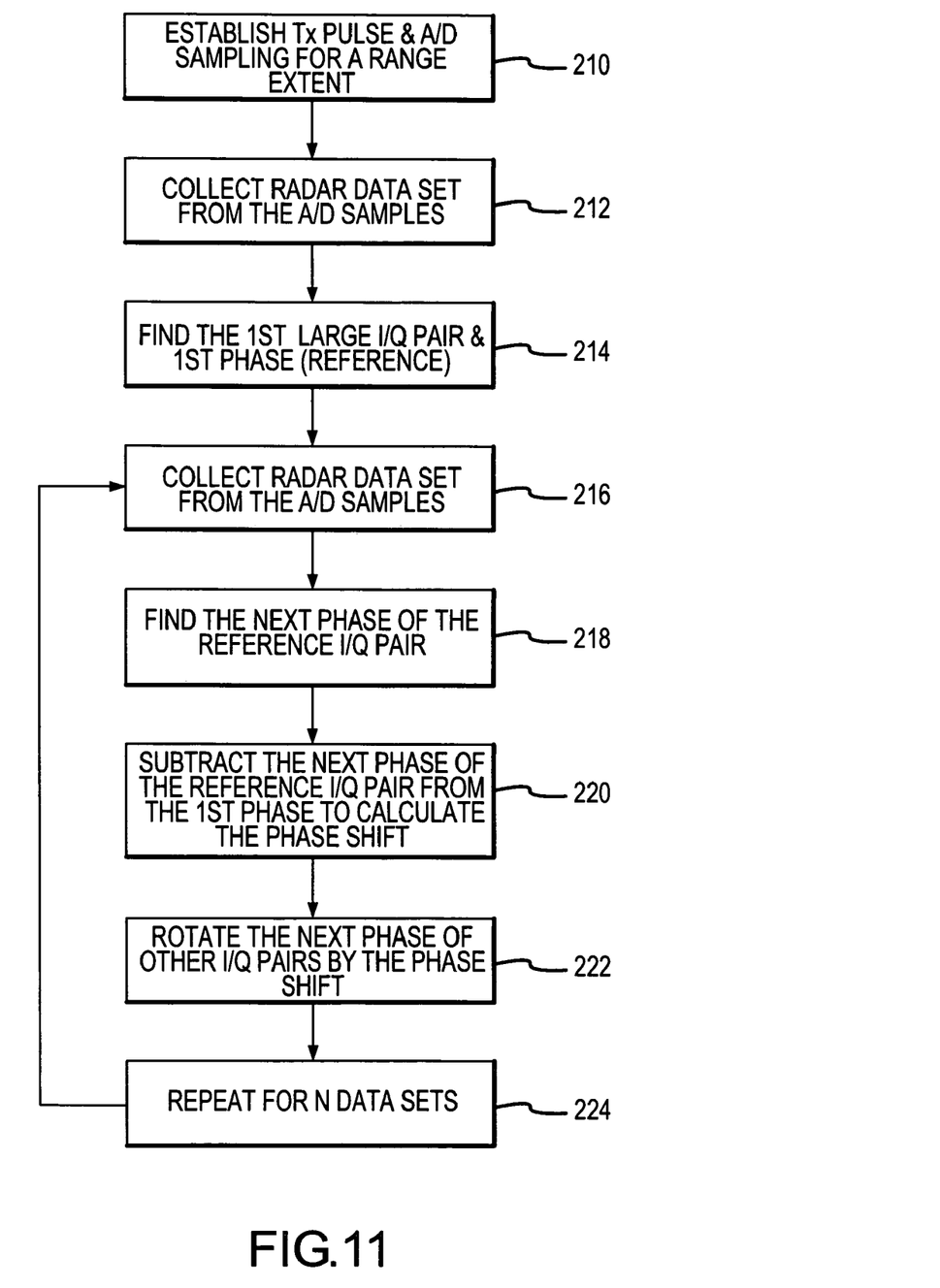
FIG. 11 is a flowchart of the steps for performing phase compensation for an IF Rx in which successive A/D time-samples provide the range gating.

As shown in FIG. 11, the I/Q sample pairs are processed using the phase compensation techniques already described. The only difference is that successive I/Q time samples, rather than analog range gates, are used to provide range gating. The Tx pulses are small and the time between samples is set so that each sample represents a separate range bin. There is no coupling between the reference and target. A specific I/Q sample (reference range bin) in the data set is established as the stationary reference instead of placing an analog range gate on the reference. The phase variation of that specific I/Q sample between data sets is used to compensate the phase for other A/D samples near the reference.

More specifically, the radar system (or soldier operating the system) first establishes the transmit (Tx) pulse and A/D sampling for a range extent (step 210). Establishing the Tx pulse may include pulse shape, duration, and pulse repetition interval (PRI). Establishing the A/D sampling for a range extent may include the sampling interval and the number of samples captured for a desired range extent. The radar system collects a data set from the A/D time samples (I/Q sample pairs) (step 212). The data set includes a plurality, e.g. 64 to 1028, of digital samples from the A/D for at least one Tx pulse and potentially several if averaging is invoked. The system identifies the I/Q pair ($m^{th}$ sample) having a large amplitude as the "stationary reference", positions its "range bin" on the stationary reference and calculates its phase from the I/Q components (step 214). This can be done for a single Tx pulse or for a pulse train by simply averaging the position and phase of the $m^{th}$ samples or by computing an FFT on the set of $m^{th}$ samples. The value in the DC bin of the FFT represents the average. The system collects another data set for at least one Tx from the I/Q sample pairs (step 216) and calculates a next phase of the $m^{th}$ sample pair (step 218).

The system subtracts the next phase of the $m_{th}$ I/Q sample pair from the $1^{st}$ phase to calculate a phase shift (step 220). The phase shift represents the drift of the reference oscillator in the time interval between measuring the first and second data sets over the range from the radar system to the stationary reference. The system rotates the phase of the I/Q sample pairs close to the stationary reference (reference range bin) in the data set by the phase shift (step 222). This has the effect of moving the radar system to the stationary reference thereby virtually eliminating phase noise due to drift of the reference oscillator provided the target is in close proximity the reference. The system repeats steps 216 through 222 until sufficient radar data is collected to detect the presence of a target (step 224).

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of reducing noise in a pulsed radar system, comprising:
   Transmitting pulses and receiving return signals to place an analog reference range gate on a stationary reference;
   Placing an ensemble of analog range gates in close proximity to the stationary reference; and
   Transmitting pulses and receiving return signals to collect data for said reference and ensemble of range gates and rotate the phase of such ensemble data by a phase shift of the reference data.

2. The method of claim 1, wherein the return signals are gated by the range gates to pass respective pulse trains, band pass filtered to extract respective center spectral lines and A/D sampled.

3. The method of claim 2, wherein band pass filtering extracts only the center spectral line and a narrow Doppler frequency band around the center line.

4. The method of claim 3, wherein the narrow Doppler frequency band is less than or equal to 200 Hz.

5. The method of claim 2, wherein the bandwidth of the A/D sampling is at least a factor of ten less than the bandwidth of the transmit pulses.

6. The method of claim 2, wherein the center spectral lines are multiplexed prior to A/D sampling.

7. The method of claim 1, wherein the ensemble comprises a plurality of overlapping analog range gates.

8. The method of claim 1, wherein the ensemble is placed within 50 M of the stationary reference.

9. The method of claim 1, wherein the ensemble is placed adjacent the stationary reference and covers an instantaneous area no greater than 50 M.

10. The method of claim 1, wherein the ensemble is placed behind the stationary reference.

11. The method of claim 1, wherein the data is collected and phase shifted by,
    (a) Collecting a data set from the reference and ensemble of range gates;
    (b) Calculating a first average phase for each gate;
    (c) Collecting another data set from the reference and ensemble of range gates;
    (d) Calculating a next average phase for each gate;
    (e) Subtracting the next average phase of the reference gate from the first average phase of the reference gate to calculate the phase shift;
    (f) Rotating the next average phase of each range gate in the ensemble by the phase shift; and
    (g) Repeating steps c through f for a plurality of data sets.

12. The method of claim 11, wherein the data sets are collected by gating the return signals by the range gates to pass respective pulse trains, band pass filtering the pulse trains to extract respective center spectral lines and A/D sampling the center spectral lines.

13. The method of claim 12, wherein during data collection for each said transmission pulse a return signal from the stationary reference is gated by the reference range gate and a return signal from a target is gated by at least one ensemble range gate.

14. The method of claim 11, wherein the average phase is the value in the DC bin of an FFT calculated on the data set.

15. A micro movement radar system, comprising:
    a reference oscillator for generating AC signals;
    a pulse forming network that forms pulses from the AC signals;
    an antenna that transmits the pulses and receives return pulses;
    a receiver including a plurality of analog range gates for receiving return signals that lie within a time window with respect to the transmit pulse,
    an A/D converter that converts the gated signals into a digital signal;
    a timing generator that generates clock signals to transmit the pulse and to activate the analog range gates; and
    a processor that controls the timing generator to (a) transmit pulses and activate the range gates to place an analog reference range gate on a stationary reference, (b) place an ensemble of analog range gates in close proximity to the stationary reference, and (c) transmit pulses and receiver return signals to collect data from the digital signal for said range gates and rotate the phase of such ensemble data by a phase shift of the reference data.

16. The micro movement radar system of claim 15, wherein the receiver further comprises a plurality of band pass filters for filtering respective pulse trains to extract center spectra lines that are passed to the A/D convener.

17. A method of reducing noise in a pulsed radar system, comprising:
    (a) Transmitting pulses and receiving return signals to place an analog reference range gate on a stationary reference;
    (b) Placing an ensemble of analog range gates in close proximity to the stationary reference;
    (c) Transmitting pulses and receiving return signals to collect data for said reference and ensemble of range gates, said return signals being gated by the analog range gates to form respective pulse trains that are band pass filtered to extract a center spectral line, multiplexed and A/D sampled;
    (d) Calculating a phase shift for said reference range gate data between a first data set of digital samples and a next data set;
    (e) Rotating the phase of the ensemble data for the next data set by the phase shift; and
    (f) repeating steps c though e for a plurality of next data sets.

18. The method of claim 17, wherein the bandwidth of the A/D sampling is at least a factor of ten less than the bandwidth of the transmit pulses.

19. The method of claim 17, wherein the ensemble comprises a plurality of overlapping analog range gates.

20. A method of reducing phase noise in a pulsed radar system, comprising:
    (a) Transmitting pulses and receiving return signals to position a reference range bin on a stationary reference;
    (b) Transmitting pulses and receiving return signals to collect data sets from said stationary reference and a target in close proximity to the stationary reference;

(c) Calculating a phase shift for said reference range bin between a first data set and a next data set;

(d) Rotating the phase of the target data for range bins near the reference range bin in the next data set by the phase shift; and (e) repeating steps b through d for a plurality of next data sets.

21. The method of claim 20, wherein the return signals are A/D sampled to generate time samples associated with respective range bins.

22. The method of claim 21, wherein the return signals are A/D sampled at a bandwidth on the order of the bandwidth of the transmit pulses.

23. The method of claim 21, wherein the time samples are represented as I/Q pairs.

24. The method of claim 21, wherein the stationary reference is located by selecting an $m^{th}$ time sample having a large amplitude indicative of the stationary reference.

25. The method of claim 24, wherein the phase shift is calculated between the $m^{th}$ sample in the first data set and the next data set and used to rotate the phase of the time samples in range bins near the $m^{th}$ time sample in the next data set.

26. The method of claim 20, wherein the return signals are gated through a plurality of analog range gates corresponding to respective range bins to pass respective pulse trains, band pass filtered and A/D sampled.

27. The method of claim 26, wherein the return signals are A/D sampled at a bandwidth at least a factor of ten less than the bandwidth of the transmit pulses.

28. The method of claim 26, wherein the time samples are represented as I/Q pairs.

29. The method of claim 26, wherein the stationary reference is located by positioning a reference analog range gate where a large amplitude indicative of the stationary reference is detected.

30. The method of claim 29, wherein the phase shift is calculated for the reference analog range gate between the first data set and the next data set and used to rotate the phase of the other analog range gates in the next data set.

31. A micro movement radar system, comprising:
a reference oscillator for generating AC signals;
a pulse forming network that forms pulses from the AC signals;
an antenna that transmits the pulses and receives return signals;
a receiver for receiving return signals,
an A/D converter that converts the return signal into a digital samples;
a timing generator that generates clock signals to transmit the pulse; and
a processor that controls the timing generator to transmit pulses and process return signals in successive data sets to (a) place a reference range bin on a stationary reference, (b) calculate a phase shift for the reference range bin between a first data set and a next data set and (c) rotate the phase of range bins near the reference range bin in the next data set by the phase shift of the reference data.

32. The micro movement radar system of claim 31, wherein the A/D converter has a bandwidth on the order of the bandwidth of the transmitted pulses, said processor selecting a reference digital sample having a large amplitude indicative of a stationary reference as the reference range bin, calculating a phase shift for the reference digital sample between the first and next data sets and rotating the phase of digital samples near the reference digital sample in the next data set by the phase shift.

33. The micro movement radar system of claim 31, wherein the receiver comprises a plurality of analog range gates corresponding to respective range bins to gate the return signals and pass respective pulse trains, a plurality of band pass filters to extract spectral lines from the pulse trains and a mux that multiplexes the spectral lines, said A/D converter sampling the multiplexed spectral lines at a bandwidth at least a factor of ten less than the bandwidth of the transmission pulses, said processor positioning a reference analog range gate on the stationary reference as the reference range bin, calculating a phase shift for the reference analog range gate between the first and next data sets and rotating the phase of the other range gates in the next data set by the phase shift.

* * * * *